W. C. CROSS.

Improvement in Stem-Calipers.

No. 129,536.                          Patented July 16, 1872.

WITNESSES.                          INVENTOR.

William C. Cross
per
Brown Brothers
Attorneys.

UNITED STATES PATENT OFFICE.

WILLIAM C. CROSS, OF BOSTON, MASSACHUSETTS.

IMPROVEMENT IN STEM-CALIPERS.

Specification forming part of Letters Patent No. 129,536, dated July 16, 1872.

*To all persons to whom these presents shall come:*

Be it known that I, WILLIAM C. CROSS, of Boston, in the county of Suffolk and State of Massachusetts, have invented a new and Improved Caliper or Gauge; and that the following is a full, clear, and exact description of the same, reference being had to the accompanying plate of drawing forming a part thereof.

This invention relates to a caliper or gauge more particularly designed for measuring the internal diameter of cylinders, pipes, &c.; but it is susceptible of use for many other and various purposes, such as spacing the distance between spindles in a spinning-machine, setting off a shoulder or shoulders on a spindle shaft or bolt, as from the following description will be obvious to all conversant with the use of tools.

Figure 1:
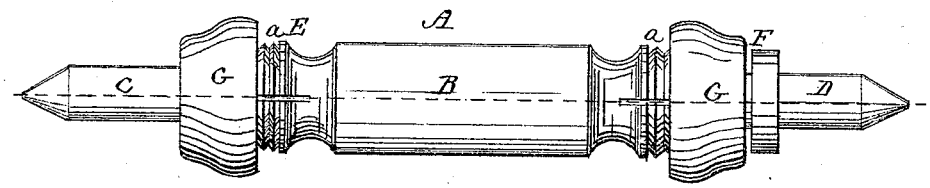
Figure 2:
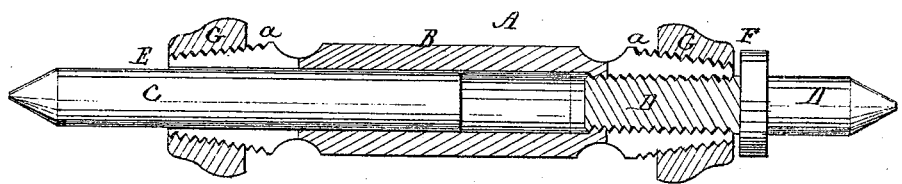

In the accompanying plate of drawing my improved caliper or gauge is illustrated, Figure 1 being a side view of the same, and Fig. 2 a central longitudinal section.

A in the drawing represents my improved caliper or gauge, constructed of a body, B, that is hollow, and at each end split for a portion of its length in four lines, and also made with a male screw-thread, $a$; C and D, stems, inserted, the one, C, loosely in the end E of body B, and the other, D, by screwing it into the body B at end F, the bore and stem being provided with a corresponding male and female screw-thread; G G, two screw-nuts, one on each screw-threaded end of body B. By these nuts, as the ends to the body B are split, the stems D and E can be fastened within the body B, or set free to be drawn or screwed out or in, and thus adjusted to project more or less from the ends of the body.

In using a gauge such as above described, first set the gauge through the stem C to about the diameter or space to be measured; then fasten such stem by properly turning the nut G therefor, and then place the gauge within the bore or other place to be measured; adjust the screw-stem D thereto, and then secure it by properly turning its nut G.

It is obvious my improved gauge is simple, efficient, and reliable, and when once adjusted and fastened is secure against accidental displacement.

The stems D and E, either one or both, may be graduated by inches, or by any suitable divisions of an inch, so that, in conjunction with the length of the body, the length of gauge, when adjusted, can be ascertained and read.

Having thus described my improved caliper or gauge, I will state my claim as follows:

What I claim as my invention, and desire to secure by Letters Patent, is—

A gauge or caliper composed of body B, stems C D, and nuts G, substantially as and for the purpose described.

The above specification of my invention signed by me this 16th day of December, A. D. 1871.

WILLIAM C. CROSS.

Witnesses:
 EDWIN W. BROWN,
 ALBERT W. BROWN.